United States Patent Office 2,781,309
Patented Feb. 12, 1957

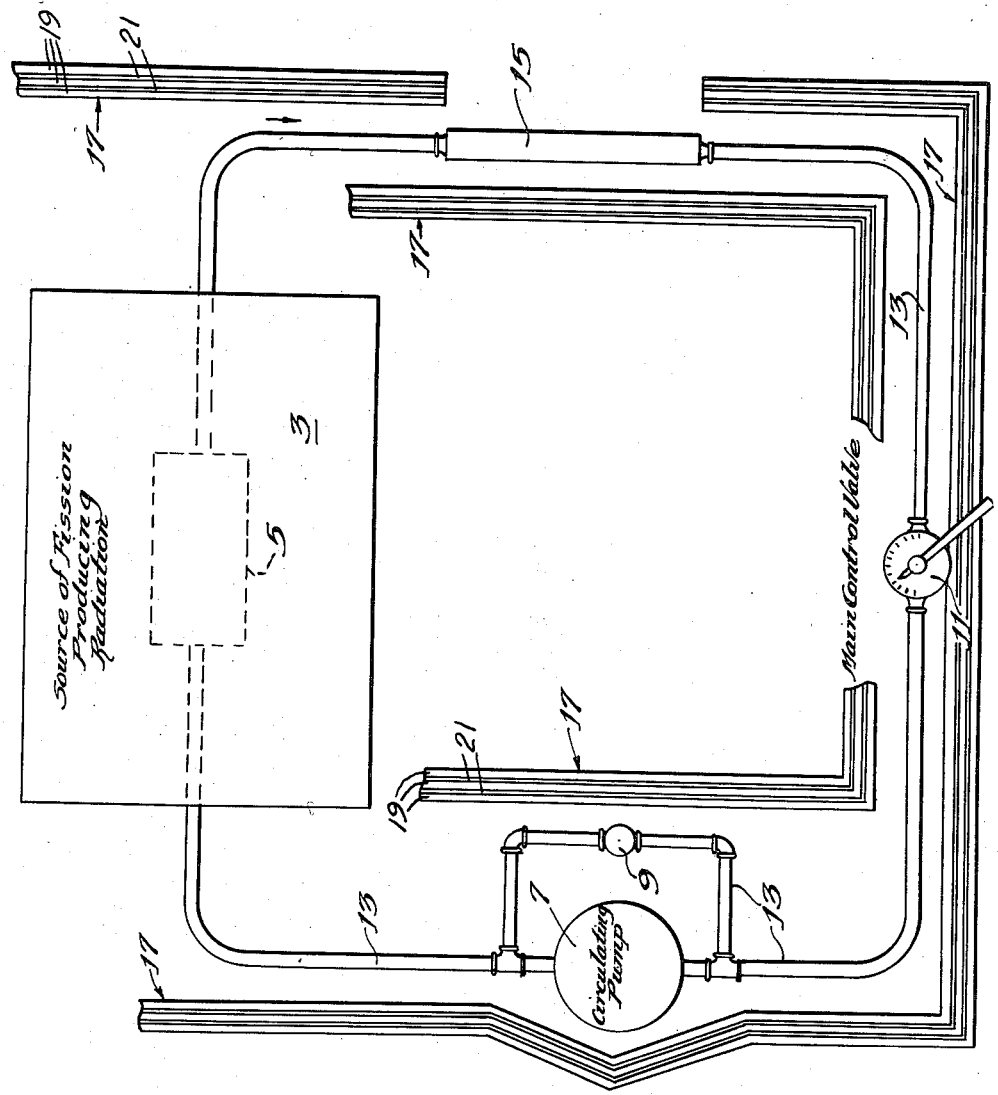

2,781,309

RADIATION SYSTEM

Joseph S. Levinger, Berwyn, Pa., Milo B. Sampson, Santa Fe, N. Mex., Arthur H. Snell, Oak Ridge, Tenn., and Roger G. Wilkinson, Santa Fe, N. Mex., assignors to the United States of America as represented by the United States Atomic Energy Commission Application November 2, 1945, Serial No. 626,380

1 Claim. (Cl. 204—193)

The present invention relates to an apparatus for utilizing the delayed neutrons produced from nuclear fission to provide an improved neutron source having important advantages over the neutron sources heretofore known in the art.

The phenomenon of nuclear fission has been known for some years and has been extensively studied and investigated. In general, it is well established that nuclear fission results when the nucleus of a fissionable material, such as the 235 isotope of uranium, captures a neutron. When such capture occurs, the nucleus of the fissionable element or isotope splits into two nuclear fragments, comprising lighter elements. Both fragments are highly radioactive, and there is emission of beta and gamma energy as the fragments decay to more stable nuclei. Neutrons are also emitted as an incident to fission, and when it is desired to provide a chain reaction, it is necessary that the number of neutrons resulting from fissions, i. e., the reproduction rate of the system, shall be greater than unity. Obviously, if this were not so, the system could not continue to chain react.

One important, and as yet not fully explained, effect has been observed in connection with the neutron emission occurring as an incident to fission. Specifically, it has been observed that slightly less than 1 per cent of the fission produced neutrons are emitted at periods of time varying from about 2.5 to about 57 seconds after the fission actually takes place. These neutrons which are emitted from the fission fragments subsequent to the actual fission of the parent nucleus are designated as delayed neutrons. So far as is known, the delayed neutrons are emitted from the fission fragment nuclei in a manner substantially similar to radioactive decay. When fission of the 235 uranium isotope occurs, about one-third of the total of the delayed neutrons will be emitted as though by radioactive decay of material having a half-life of 2.5 seconds. Approximately another third of the delayed neutrons will be emitted as by a material having a half-life of 7 seconds. Most of the remainder will exhibit a half-life of 24 seconds, and the final small fraction, about 4 percent of the total, will be emitted as by a material having a half-life of 57 seconds.

The present invention makes use of this delayed neutron effect for the purpose of obtaining neutron emission in readily controllable densities at places remote from the primary source of the neutrons, which may be a neutronic reactor or other source of fission-inducing radiation. As will hereinafter appear, the invention makes possible a neutron source of unusual flexibility and of great utility in the fields of physical research and neutron therapy.

An exemplary system for carrying out the invention is diagrammatically disclosed in the single figure of the drawings. In that figure, a means for inducing fissions in a fissionable material, which means may conveniently comprise a source of neutron radiation such as a neutronic reactor, is indicated at 3. The details of a suitable neutronic reactor are given in Fermi et al. Patent No. 2,708,656, which issued on May 17, 1955, on an application filed on December 19, 1944. Within the reactor 3 there is positioned a main reservoir or closure 5 which is connected to a closed liquid circulating system disposed externally of the reactor. This system includes a circulating pump 7, having a by pass valve 9, a main control valve 11, suitable piping 13, and a second reservoir or closure 15, which is of such a shape and dimensions that it may be employed as a neutron source, since it is within this portion of the circulating system that the liberation of delayed neutrons is caused to take place.

If the apparatus is to be used for therapeutic treatment, the neutron source reservoir or closure 15 may conveniently comprise a section of glass tubing adapted to be disposed adjacent or even within the part of the body which is to be subjected to neutron irradiation. If the source is to be employed for physical research, the dimensions and arrangements of the reservoir or chamber 15 will be determined by the particular problem at hand. When the source of the fission-producing radiation constitutes a primary source of neutrons, such as the neutronic reactor 3, the second reservoir portion 15 of the circulating system may properly be designated as a secondary neutron source. It will be understood, however, that means other than a neutronic reactor can be used as the source of fission-producing radiation comprising a part of the apparatus of the invention. For example, a source of high energy deuterons or other fission-producing radiation could be used.

The reservoirs 5 and 15, the associated conduit 13, the control valves 9 and 11, and the pump 7, which constitute a closed liquid circulating system, contain a solution or a suspension of a material in which fissions can be induced by the radiation provided by the source 3. For example, when a source of neutrons is employed as the fission-producing means, the system may contain an aqueous solution of uranyl nitrate, or a suspension of uranium oxide in deuterium oxide (heavy water).

During the operation of the apparatus, the solution or suspension of fissionable material will be circulated through the main reservoir, which is positioned to receive the fission producing radiation, and the second reservoir, which is positioned for use as a neutron source, in sequence. In the particular apparatus illustrated, wherein the neutronic reactor 3 is employed as such source, the main reservoir 5 is located centrally of the reactor, where the highest neutron density will be encountered. The neutron, or other radiation provided by the source 3, will induce fissions in that portion of the solution or suspension of fissionable material contained in the main reservoir 5, and since this material is being continuously circulated from one reservoir to the other, it will be apparent that the circulation rate can be so adjusted by operation of the valves 9 and 11 that delayed neutron emission from the fission fragments of the fissions induced in the main reservoir will occur in the secondary reservoir portion 15 of the external system. Furthermore, since the delayed neutron emission from the fission fragments exhibits definite half-life decay characteristics following the fission of the parent nucleus, it is possible to accurately regulate the neutron density at the secondary reservoir 15. Further, since very substantial time intervals are involved in the delayed neutron emission, it is possible to pipe the neutron-emitting fluid very considerable distances. An additional very important advantage of the invention results from the fact that the neutron emission at the secondary reservoir 15 can be, in effect, turned "off" and "on" simply by opening and closing the main control valve 11.

Instead of utilizing a fluid containing a fissionable material in the form of a solution or suspension, other means may be employed for conducting the delayed neutron-emitting fission fragments to the region where the delayed neutron emission is to be used. For example, the main reservoir 5 may be filled with uranium chips, and, water or other liquid may be circulated therethrough. This liquid will pick up the fission fragments from the uranium either mechanically or by dissolution, and will serve to carry those fragments to the secondary reservoir 15 where they are to be liberated. Somewhat more stable operation of the apparatus is possible over extended periods of time by the use of a solution or suspension, but the chip arrangement works very satisfactorily, and, in some instances, it is more convenient to assemble and use.

Regardless of which arrangement is employed, however, the entire liquid circulating system will soon contain substantial quantities of highly radioactive fission fragments, and these radioactive fragments will induce radioactivity in the pump, the conduit, and the other mechanical portions of the circulating system. It is extremely desirable, therefore, that the entire system be enclosed within a suitable shield which may comprise alternate layers 19 of metal, such as cadmium or iron, and layers 21 of hydrogenous material, such as paraffin or hot-pressed fiberboard. Such a shield is indicated generally at 17 in the drawing. It will be understood that the particular shape and proportions of the shield 17 will be determined by the particular requirements of the installation. Due to this induced radioactivity, it may be found necessary when the device is being employed for therapeutic purposes to replace the secondary reservoir 15, which is employed as the source portion of the system, at frequent intervals, or to employ suitable shields for protecting the patient from radiation of other types than neutron radiation, which may result from the radioactivity of the fission products.

The system disclosed comprises a novel and highly useful neutron source. It has proven practical in actual tests, and is a most useful tool in the fields for which it is adapted. The features of the invention, which are believed to be new, are expressly pointed out in the appended claim.

What is claimed is:

A device for irradiating bodies comprising, a neutronic reactor, a closed circulating system including a first reservoir disposed within the reactor, a second reservoir, a valve, and a pump for circulating a suspension of uranium oxide in deuterium oxide from the first reservoir to the other within a period of about 2.5 to 57 seconds, a suspension of uranium oxide in deuterium oxide disposed within the circulating system, and a shield having a first portion disposed between the reactor and the section of the circulating system disposed exterior to the reactor and a second portion confronting the circulating system provided with an aperture adjacent to the second reservoir, whereby the object to be irradiated may be disposed confronting the aperture and the magnitude of the neutron flux emanating from the second reservoir varied by the valve and pump without altering the neutron flux within the neutronic reactor.

References Cited in the file of this patent
UNITED STATES PATENTS

| | | |
|---|---|---|
| 549,435 | Cabell | Nov. 5, 1895 |
| 2,161,985 | Szilard | June 13, 1939 |
| 2,206,634 | Fermi et al. | July 2, 1940 |

FOREIGN PATENTS

| | | |
|---|---|---|
| 114,150 | Australia | May 2, 1940 |
| 233,011 | Switzerland | Oct. 2, 1944 |
| 861,390 | France | Oct. 28, 1940 |

OTHER REFERENCES

Fluegge: Berlin-Dahlem (from the Kaiser Wilhelm Institute for Chemistry), "Die Naturwissenshaften," Sept. 6, 1939, pages 402–410.

AECD-3051, "Criticality of the Water Boiler and Effective Number of Delayed Neutrons," by De Hoffmann, Dec. 8, 1944; date declassified Jan. 30, 1951; 27 pages, U. S. A. E. C.

Smyth: "Atomic Energy for Military Purposes," pages 22, 103, 104, 177, August 1945.

Kelly et al.: Phy. Rev. 73, 1135–9 (1948).